US 9,400,786 B2

(12) United States Patent
Lancaster et al.

(10) Patent No.: US 9,400,786 B2
(45) Date of Patent: *Jul. 26, 2016

(54) COMPUTER-IMPLEMENTED METHOD, COMPUTER SOFTWARE AND APPARATUS FOR USE IN A TRANSLATION SYSTEM

(71) Applicant: SDL PLC, Maidenhead (GB)

(72) Inventors: Mark Lancaster, Chesham (GB); Alastair Gordon, London (GB); Keith Mills, Binfield (GB)

(73) Assignee: SDL PLC, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,451

(22) Filed: Jul. 25, 2013

(65) Prior Publication Data

US 2013/0346062 A1 Dec. 26, 2013

Related U.S. Application Data

(63) Continuation of application No. 11/525,231, filed on Sep. 21, 2006, now Pat. No. 8,521,506.

(51) Int. Cl.
*G06F 17/28* (2006.01)

(52) U.S. Cl.
CPC .............. *G06F 17/289* (2013.01); *G06F 17/28* (2013.01); *G06F 17/2827* (2013.01); *G06F 17/2836* (2013.01)

(58) Field of Classification Search
USPC ...................................................... 704/2–10
See application file for complete search history.

(56) References Cited

U.S. PATENT DOCUMENTS

| 4,661,924 A | 4/1987 | Okamoto et al. |
| 4,674,044 A | 6/1987 | Kalmus et al. |
| 4,677,552 A | 6/1987 | Sibley, Jr. |
| 4,789,928 A | 12/1988 | Fujisaki |
| 4,903,201 A | 2/1990 | Wagner |
| 4,916,614 A | 4/1990 | Kaji et al. |

(Continued)

FOREIGN PATENT DOCUMENTS

| AU | 199938259 | 11/1999 |
| AU | 761311 | 9/2003 |

(Continued)

OTHER PUBLICATIONS

First Examination Report mailed Nov. 26, 2009 for European Patent Application 05772051.8, filed May 8, 2006.

(Continued)

*Primary Examiner* — Leonard Saint Cyr
(74) *Attorney, Agent, or Firm* — Carr & Ferrell LLP

(57) ABSTRACT

A computer-implemented method for use in natural language translation comprises performing in software processes, the steps of: comparing source material with stored material in a first natural language, said stored material having previously been translated from said first natural language to at least a second natural language, identifying at least a part of said source material which has a relationship with at least a part of said stored material, outputting said identified part of source material and said identified part of stored material in a form suitable for review by a user, and replacing said identified part of source material with said identified part of stored material to assist full translation of said source material from said first natural language to at least said second natural language.

34 Claims, 7 Drawing Sheets

(56) References Cited

U.S. PATENT DOCUMENTS

| | | | |
|---|---|---|---|
| 4,962,452 A | 10/1990 | Nogami et al. | |
| 4,992,940 A | 2/1991 | Dworkin | |
| 5,005,127 A | 4/1991 | Kugimiya et al. | |
| 5,020,021 A | 5/1991 | Kaji et al. | |
| 5,075,850 A | 12/1991 | Asahioka et al. | |
| 5,093,788 A | 3/1992 | Shiotani et al. | |
| 5,111,398 A | 5/1992 | Nunberg et al. | |
| 5,140,522 A | 8/1992 | Ito et al. | |
| 5,146,405 A | 9/1992 | Church | |
| 5,168,446 A | 12/1992 | Wiseman | |
| 5,224,040 A | 6/1993 | Tou | |
| 5,243,515 A | 9/1993 | Lee | |
| 5,243,520 A | 9/1993 | Jacobs et al. | |
| 5,283,731 A | 2/1994 | Lalonde et al. | |
| 5,295,068 A | 3/1994 | Nishino et al. | |
| 5,301,109 A | 4/1994 | Landauer et al. | |
| 5,325,298 A | 6/1994 | Gallant | |
| 5,349,368 A | 9/1994 | Takeda et al. | |
| 5,408,410 A | 4/1995 | Kaji | |
| 5,418,717 A | 5/1995 | Su et al. | |
| 5,423,032 A | 6/1995 | Byrd et al. | |
| 5,477,451 A | 12/1995 | Brown et al. | |
| 5,490,061 A | 2/1996 | Tolin et al. | |
| 5,497,319 A | 3/1996 | Chong et al. | |
| 5,510,981 A | 4/1996 | Berger et al. | |
| 5,541,836 A | 7/1996 | Church et al. | |
| 5,548,508 A | 8/1996 | Nagami | |
| 5,555,343 A | 9/1996 | Luther | |
| 5,587,902 A | 12/1996 | Kugimiya | |
| 5,640,575 A | 6/1997 | Maruyama et al. | |
| 5,642,522 A | 6/1997 | Zaenen et al. | |
| 5,644,775 A | 7/1997 | Thompson et al. | |
| 5,687,384 A | 11/1997 | Nagase | |
| 5,708,825 A | 1/1998 | Sotomayor | |
| 5,710,562 A | 1/1998 | Gormish et al. | |
| 5,715,402 A | 2/1998 | Popolo | |
| 5,724,593 A | 3/1998 | Hargrave, III et al. | |
| 5,751,957 A | 5/1998 | Hiroya et al. | |
| 5,764,906 A | 6/1998 | Edelstein et al. | |
| 5,765,138 A | 6/1998 | Aycock et al. | |
| 5,794,219 A | 8/1998 | Brown | |
| 5,799,269 A | 8/1998 | Schabes et al. | |
| 5,802,502 A | 9/1998 | Gell et al. | |
| 5,802,525 A | 9/1998 | Rigoutsos | |
| 5,818,914 A | 10/1998 | Fujisaki | |
| 5,819,265 A | 10/1998 | Ravin et al. | |
| 5,826,244 A | 10/1998 | Huberman | |
| 5,842,204 A | 11/1998 | Andrews et al. | |
| 5,844,798 A | 12/1998 | Uramoto | |
| 5,845,143 A | 12/1998 | Yamauchi et al. | |
| 5,845,306 A | 12/1998 | Schabes et al. | |
| 5,848,386 A | 12/1998 | Motoyama | |
| 5,850,442 A | 12/1998 | Muftic | |
| 5,850,561 A | 12/1998 | Church et al. | |
| 5,864,788 A | 1/1999 | Kutsumi | |
| 5,884,246 A | 3/1999 | Boucher et al. | |
| 5,895,446 A | 4/1999 | Takeda et al. | |
| 5,917,484 A | 6/1999 | Mullaney | |
| 5,950,194 A | 9/1999 | Bennett et al. | |
| 5,956,711 A | 9/1999 | Sullivan et al. | |
| 5,956,740 A | 9/1999 | Nosohara | |
| 5,960,382 A | 9/1999 | Steiner | |
| 5,966,685 A | 10/1999 | Flanagan et al. | |
| 5,974,371 A | 10/1999 | Hirai et al. | |
| 5,974,413 A | 10/1999 | Beauregard et al. | |
| 5,987,401 A | 11/1999 | Trudeau | |
| 5,987,403 A | 11/1999 | Sugimura | |
| 6,044,363 A | 3/2000 | Mori et al. | |
| 6,047,299 A | 4/2000 | Kaijima | |
| 6,070,138 A | 5/2000 | Iwata | |
| 6,092,034 A | 7/2000 | McCarley et al. | |
| 6,092,035 A | 7/2000 | Kurachi et al. | |
| 6,131,082 A | 10/2000 | Hargrave, III et al. | |
| 6,139,201 A | 10/2000 | Carbonell et al. | |
| 6,154,720 A * | 11/2000 | Onishi | G06F 17/2785 704/2 |
| 6,161,082 A | 12/2000 | Goldberg et al. | |
| 6,163,785 A | 12/2000 | Carbonell et al. | |
| 6,260,008 B1 | 7/2001 | Sanfilippo | |
| 6,278,969 B1 | 8/2001 | King et al. | |
| 6,285,978 B1 | 9/2001 | Bernth et al. | |
| 6,301,574 B1 | 10/2001 | Thomas et al. | |
| 6,304,846 B1 | 10/2001 | George et al. | |
| 6,338,033 B1 | 1/2002 | Bourbonnais et al. | |
| 6,341,372 B1 | 1/2002 | Datig | |
| 6,345,244 B1 | 2/2002 | Clark | |
| 6,345,245 B1 | 2/2002 | Sugiyama et al. | |
| 6,347,316 B1 | 2/2002 | Redpath | |
| 6,353,824 B1 | 3/2002 | Boguraev et al. | |
| 6,385,568 B1 | 5/2002 | Brandon et al. | |
| 6,393,389 B1 | 5/2002 | Chanod et al. | |
| 6,401,105 B1 | 6/2002 | Carlin et al. | |
| 6,442,524 B1 | 8/2002 | Ecker et al. | |
| 6,470,306 B1 | 10/2002 | Pringle et al. | |
| 6,473,729 B1 | 10/2002 | Gastaldo et al. | |
| 6,526,426 B1 | 2/2003 | Lakritz | |
| 6,622,121 B1 | 9/2003 | Crepy et al. | |
| 6,623,529 B1 | 9/2003 | Lakritz | |
| 6,658,627 B1 | 12/2003 | Gallup et al. | |
| 6,687,671 B2 | 2/2004 | Gudorf et al. | |
| 6,731,625 B1 | 5/2004 | Eastep et al. | |
| 6,782,384 B2 | 8/2004 | Sloan et al. | |
| 6,952,691 B2 | 10/2005 | Drissi et al. | |
| 6,993,473 B2 | 1/2006 | Cartus | |
| 7,020,601 B1 | 3/2006 | Hummel et al. | |
| 7,100,117 B1 | 8/2006 | Chwa et al. | |
| 7,110,938 B1 | 9/2006 | Cheng et al. | |
| 7,155,440 B1 | 12/2006 | Kronmiller et al. | |
| 7,185,276 B2 | 2/2007 | Keswa | |
| 7,194,403 B2 | 3/2007 | Okura et al. | |
| 7,209,875 B2 | 4/2007 | Quirk et al. | |
| 7,266,767 B2 | 9/2007 | Parker | |
| 7,343,551 B1 | 3/2008 | Bourdev | |
| 7,353,165 B2 | 4/2008 | Zhou et al. | |
| 7,533,338 B2 | 5/2009 | Duncan et al. | |
| 7,580,960 B2 * | 8/2009 | Travieso | G06F 17/289 |
| 7,587,307 B2 | 9/2009 | Cancedda et al. | |
| 7,594,176 B2 | 9/2009 | English | |
| 7,596,606 B2 | 9/2009 | Codignotto | |
| 7,627,479 B2 | 12/2009 | Travieso et al. | |
| 7,640,158 B2 | 12/2009 | Detlef et al. | |
| 7,693,717 B2 | 4/2010 | Kahn et al. | |
| 7,698,124 B2 | 4/2010 | Menezes et al. | |
| 7,925,494 B2 | 4/2011 | Cheng et al. | |
| 7,983,896 B2 | 7/2011 | Ross et al. | |
| 8,050,906 B1 * | 11/2011 | Zimmerman et al. | 704/2 |
| 8,521,506 B2 | 8/2013 | Lancaster et al. | |
| 8,620,793 B2 | 12/2013 | Knyphausen et al. | |
| 8,874,427 B2 | 10/2014 | Ross et al. | |
| 8,935,148 B2 | 1/2015 | Christ | |
| 8,935,150 B2 | 1/2015 | Christ | |
| 9,128,929 B2 | 9/2015 | Albat | |
| 9,262,403 B2 | 2/2016 | Christ | |
| 9,342,506 B2 | 5/2016 | Ross et al. | |
| 2002/0002461 A1 | 1/2002 | Tetsumoto | |
| 2002/0093416 A1 | 7/2002 | Goers et al. | |
| 2002/0099547 A1 | 7/2002 | Chu et al. | |
| 2002/0103632 A1 | 8/2002 | Dutta et al. | |
| 2002/0110248 A1 | 8/2002 | Kovales et al. | |
| 2002/0111787 A1 | 8/2002 | Knyphausen et al. | |
| 2002/0138250 A1 | 9/2002 | Okura et al. | |
| 2002/0165708 A1 | 11/2002 | Kumhyr | |
| 2002/0169592 A1 | 11/2002 | Aityan | |
| 2002/0198701 A1 | 12/2002 | Moore | |
| 2003/0004702 A1 * | 1/2003 | Higinbotham | G06F 17/2836 704/2 |
| 2003/0016147 A1 | 1/2003 | Evans | |
| 2003/0040900 A1 | 2/2003 | D'Agostini | |
| 2003/0069879 A1 | 4/2003 | Sloan et al. | |
| 2003/0078766 A1 | 4/2003 | Appelt et al. | |
| 2003/0105621 A1 | 6/2003 | Mercier | |
| 2003/0120479 A1 | 6/2003 | Parkinson et al. | |
| 2003/0158723 A1 | 8/2003 | Masuichi et al. | |

(56) References Cited

U.S. PATENT DOCUMENTS

| | | |
|---|---|---|
| 2003/0182279 A1 | 9/2003 | Willows |
| 2003/0194080 A1 | 10/2003 | Michaelis et al. |
| 2003/0229622 A1 | 12/2003 | Middelfart |
| 2003/0233222 A1 | 12/2003 | Soricut et al. |
| 2004/0122656 A1 | 6/2004 | Abir |
| 2004/0172235 A1 | 9/2004 | Pinkham et al. |
| 2005/0021323 A1 | 1/2005 | Li |
| 2005/0055212 A1 | 3/2005 | Nagao |
| 2005/0075858 A1 | 4/2005 | Pournasseh et al. |
| 2005/0094475 A1 | 5/2005 | Naoi |
| 2005/0171758 A1 | 8/2005 | Palmquist |
| 2005/0197827 A1 | 9/2005 | Ross et al. |
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095848 A1 | 5/2006 | Naik |
| 2006/0136277 A1 | 6/2006 | Perry |
| 2006/0256139 A1 | 11/2006 | Gikandi |
| 2006/0287844 A1 | 12/2006 | Rich |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1 | 3/2008 | Lancaster et al. |
| 2008/0141180 A1 | 6/2008 | Reed et al. |
| 2008/0147378 A1 | 6/2008 | Hall |
| 2008/0243834 A1 | 10/2008 | Rieman et al. |
| 2008/0294982 A1 | 11/2008 | Leung et al. |
| 2009/0132230 A1 | 5/2009 | Kanevsky et al. |
| 2009/0187577 A1 | 7/2009 | Reznik et al. |
| 2009/0204385 A1 | 8/2009 | Cheng et al. |
| 2009/0248182 A1 | 10/2009 | Logan et al. |
| 2009/0248482 A1 | 10/2009 | Knyphausen et al. |
| 2009/0326917 A1 | 12/2009 | Hegenberger |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0184719 A1 | 7/2011 | Christ |
| 2012/0046934 A1 | 2/2012 | Cheng et al. |
| 2012/0095747 A1 | 4/2012 | Ross et al. |
| 2012/0185235 A1 | 7/2012 | Albat |
| 2014/0006006 A1 | 1/2014 | Christ |
| 2014/0012565 A1 | 1/2014 | Lancaster et al. |
| 2015/0142415 A1 | 5/2015 | Cheng et al. |
| 2015/0169554 A1 | 6/2015 | Ross et al. |

FOREIGN PATENT DOCUMENTS

| | | |
|---|---|---|
| BE | 1076861 | 6/2005 |
| CA | 2331184 | 7/2009 |
| CH | 1076861 | 6/2005 |
| CN | 1770144 | 5/2006 |
| CN | 101019113 | 8/2007 |
| CN | ZI99808249.X | 7/2009 |
| CN | 101826072 | 9/2010 |
| CN | ZL200680015388.6 | 10/2010 |
| CN | 102053958 | 5/2011 |
| DE | 69925831 | 6/2005 |
| DE | 2317447 | 1/2014 |
| EP | 0262938 | 4/1988 |
| EP | 0668558 | 8/1995 |
| EP | 0887748 | 12/1998 |
| EP | 1076861 | 11/1999 |
| EP | 1266313 | 12/2002 |
| EP | 1076861 | 6/2005 |
| EP | 18787221 | 5/2007 |
| EP | 1889149 | 2/2008 |
| EP | 2226733 | 9/2010 |
| EP | 2317447 | 5/2011 |
| EP | 2336899 | 6/2011 |
| EP | 2317447 | 1/2014 |
| FR | 1076861 | 6/2005 |
| GB | UK1076861 | 6/2005 |
| GB | 2433403 | 6/2007 |
| GB | UK2468278 | 9/2010 |
| GB | UK2317447 | 1/2014 |
| GB | UK2474839 | 5/2014 |
| IE | 1076861 | 6/2005 |
| JP | 04152466 | 5/1992 |
| JP | 05135095 | 6/1993 |
| JP | 05197746 | 8/1993 |
| JP | 06035962 | 2/1994 |
| JP | 06259487 | 9/1994 |
| JP | 07093331 | 4/1995 |
| JP | 08055123 | 2/1996 |
| JP | 9114907 | 5/1997 |
| JP | 10063747 | 3/1998 |
| JP | 10097530 | 4/1998 |
| JP | 2002513970 | 5/2002 |
| JP | 2003150623 | 5/2003 |
| JP | 2004318510 | 11/2004 |
| JP | 2005107597 | 4/2005 |
| JP | 2005197827 | 7/2005 |
| JP | 2007249606 | 9/2007 |
| JP | 2008152670 | 7/2008 |
| JP | 2008152760 | 7/2008 |
| JP | 4718687 | 4/2011 |
| JP | 2011095841 | 5/2011 |
| MX | 244945 | 4/2007 |
| NL | 2317447 | 1/2014 |
| WO | WO9406086 | 3/1994 |
| WO | WO2006016171 | 5/1997 |
| WO | WO 9804061 | 1/1998 |
| WO | WO9957651 | 11/1999 |
| WO | WO0057320 | 9/2000 |
| WO | WO0101289 | 1/2001 |
| WO | WO0129696 | 4/2001 |
| WO | WO0229622 | 4/2002 |
| WO | WO2006121849 | 11/2006 |
| WO | WO2008055360 | 5/2008 |
| WO | WO2008083503 | 7/2008 |
| WO | WO2008147647 | 12/2008 |

OTHER PUBLICATIONS

Second Examination Report mailed Feb. 19, 2013 for European Patent Application 06759147.9, filed May 8, 2006.

Langlais, et al. "TransType: a Computer-Aided Translation Typing System", in Conference on Language Resources and Evaluation, 2000.

First Notice of Reasons for Rejection mailed Jun. 18, 2013 for Japanese Patent Application 2009-246729, filed Oct. 27, 2009.

First Notice of Reasons for Rejection mailed Jun. 4, 2013 for Japanese Patent Application 2010-045531, filed Oct. 27, 2009.

Rejection Decision mailed May 14, 2013 for Chinese Patent Application 200910253192.6, filed Dec. 14, 2009.

Matsunaga, et al. "Sentence Matching Algorithm of Revised Documents with Considering Context Information," IEICE Technical Report, 2003, pp. 43-48.

Pennington, Paula K. Improving Quality in Translation Through an Awareness of Process and Self-Editing Skills. Eastern Michigan University, ProQuest, UMI Dissertations Publishing, 1994.

Notice of Allowance mailed Jan. 7, 2014 for Japanese Patent Application 2009-246729, filed Oct. 27, 2009.

Kumano et al., "Japanese-English Translation Selection Using Vector Space Model," Journal of Natural Language Processing; vol. 10; No. 3; (2003); pp. 39-59.

Final Rejection and a Decision to Dismiss the Amendment mailed Jan. 7, 2014 for Japanese Patent Application 2010-045531, filed Mar. 2, 2010.

Office Action mailed Feb. 24, 2014 for Chinese Patent Application No. 201010521841.9, filed Oct. 25, 2010.

Komatsu, H et al, "Corpus-based predictive text input", "Proceedings of the 2005 International Conference on Active Media Technology", 2005, IEEE, pp. 75-80, ISBN 0-7803-9035-0.

(56) References Cited

OTHER PUBLICATIONS

Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111-131.
De Gispert, A., Marino, J.B. and Crego, J.M.: "Phrase-Based Alignment Combining Corpus Cooccurrences and Linguistic Knowledge" Proc. Of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005].
Web Page—New Auction Art Preview, www.netauction.net/dragonart.html, "Come bid on original illustrations," by Greg & Tim Hildebrandt, Feb. 3, 2001. (last accessed Nov. 16, 2011).
Web Pages—BidNet, www.bidnet.com, "Your link to the State and Local Government Market," including Bid Alert Service, Feb. 7, 2009. (last accessed Nov. 16, 2011).
Web Pages—Christie's, www.christies.com, including "How to Buy," and "How to Sell," Apr. 23, 2009. (last accessed Nov. 16, 2011).
Web Pages—Artrock Auction, www.commerce.com, Auction Gallery, Apr. 7, 2007. (last accessed Nov. 16, 2011).
Trados Translator's Workbench for Windows, 1994-1995, Trados GbmH, Stuttgart, Germany, pp. 9-13 and 27-96.
Notification of Reasons for Refusal for Japanese Application No. 2000-607125 mailed on Nov. 10, 2009 (Abstract Only).
Ross et al., U.S. Appl. No. 11/071,706, filed Mar. 3, 2005, Office Communication dated Dec. 13, 2007.
Ross et al., U.S. Appl. No. 11/071,706, filed Mar. 3, 2005, Office Communication dated Oct. 6, 2008.
Ross et al., U.S. Appl. No. 11/071,706, filed Mar. 3, 2005, Office Communication dated Jun. 9, 2009.
Ross et al., U.S. Appl. No. 11/071,706, filed Mar. 3, 2005, Office Communication dated Feb. 18, 2010.
Colucci, Office Communication for U.S. Appl. No. 11/071,706 dated Sep. 24, 2010.
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
International Search Report and Written Opinion dated Sep. 4, 2007 in Application No. PCT/US06/17398.
XP 002112717—Machine translation software for the Internet, Harada K.; et al, vol. 28, Nr:2, pp. 66-74. Sanyo Technical Review—San'yo Denki Giho, Hirakata, JP—ISSN 0285-516X, Oct. 1, 1996.
XP 000033460—Method to Make a Translated Text File Have the Same Printer Control Tags as the Original Text File, vol. 32, Nr:2, pp. 375-377, IBM Technical Disclosure Bulletin, International Business Machines Corp. (Thornwood), US—ISSN 0018-8689, Jul. 1, 1989.
XP 002565038—Integrating Machine Translation into Translation Memory Systems, Matthias Heyn, pp. 113-126, TKE. Terminology and Knowledge Engineering. Proceedingsinternational Congress on Terminology and Knowledge Engineering, Aug. 29-30, 1996.
XP 002565039—Linking translation memories with example-based machine translation, Michael Carl; Silvia Hansen, pp. 617-624, Machine Translation Summit. Proceedings, Sep. 1, 1999.
XP 55024828—TransType2—An Innovative Computer-Assisted Translation System, ACL 2004, Jul. 21, 2004, Retrieved from the Internet: http://www.mt-archive.info/ACL-2004-Esteban.pdf [retrieved on Apr. 18, 2012].
Bourigault, Surface Grammatical Analysis for the Extraction of Terminological Noun Phrases, Proc. Of Coling-92, Aug. 23, 1992, pp. 977-981, Nantes, France.

Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. Of EAMT, 2006, pp. 33-40 (2006).
Okura, Seiji et al., "Translation Assistance by Autocomplete," The Association for Natural Language Processing, Publication 13th Annual Meeting Proceedings, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Non-parallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150.9, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
Extended European Search Report mailed Oct. 24, 2014 for European Patent Application 10185842.1, filed Oct. 1, 2010.
Summons to attend oral proceeding pursuant to Rule 115(1)(EPC) mailed Oct. 13, 2014 in European Patent Application 00902634.5 filed Jan. 26, 2000.
Summons to attend oral proceeding pursuant to Rule 115(1)(EPC) mailed Feb. 3, 2015 in European Patent Application 06759147.9 filed May 8, 2006.

(56) References Cited

OTHER PUBLICATIONS

Decision to Refuse mailed Mar. 2, 2015 in European Patent Application 00902634.5 filed Jan. 26, 2000.
Brief Communication mailed Jun. 17, 2015 in European Patent Application 06759147.9 filed May 8, 2006.
Somers, H. "EBMT Seen as Case-based Reasoning" Mt Summit VIII Workshop on Example-Based Machine Translation, 2001, pp. 56-65, XP055196025.
The Minutes of Oral Proceedings mailed Mar. 2, 2015 in European Patent Application 00902634.5 filed Jan. 26, 2000.
Notification of Reexamination mailed Aug. 18, 2015 in Chinese Patent Application 2009102531926, filed Dec. 14, 2009.
Decision to Refuse mailed Aug. 24, 2015 in European Patent Application 06759147.9, filed May 8, 2006.
Non-Final Office Action, Jun. 18, 2013, U.S. Appl. No. 13/007,445, filed Jan. 14, 2011.
Final Office Action, Oct. 29, 2013, U.S. Appl. No. 13/007,445, filed Jan. 14, 2011.
Final Office Action, Oct. 17, 2013, U.S. Appl. No. 13/007,460, filed Jan. 14, 2011.
Non-Final Office Action, Feb. 28, 2013, U.S. Appl. No. 13/007,460, filed Jan. 14, 2011.
Advisory Action, Mar. 31, 2014, U.S. Appl. No. 13/007,460, filed Jan. 14, 2011.
Final Office Action, Aug. 29, 2013, U.S. Appl. No. 12/477,708, filed Jun. 3, 2009.
Non-Final Office Action, Jan. 29, 2013, U.S. Appl. No. 12/477,708, filed Jun. 3, 2009.
Non-Final Office Action, Jun. 6, 2012, U.S. Appl. No. 12/477,708, filed Jun. 3, 2009.
Non-Final Office Action, Dec. 30, 2011, U.S. Appl. No. 12/477,708, filed Jun. 3, 2009.
Advisory Action, Sep. 21, 2011, U.S. Appl. No. 12/477,708, filed Jun. 3, 2009.
Final Office Action, Jun. 21, 2011, U.S. Appl. No. 12/477,708, filed Jun. 3, 2009.
Non-Final Office Action, Oct. 5, 2010, U.S. Appl. No. 12/477,708, filed Jun. 3, 2009.
Office Action, Mar. 26, 2014, U.S. Appl. No. 12/477,708, filed Jun. 3, 2009.
Notice of Allowance, Aug. 28, 2013, U.S. Appl. No. 12/791,527, filed Jun. 1, 2010.
Non-Final Office Action, Sep. 26, 2012, U.S. Appl. No. 12/791,527, filed Jun. 1, 2010.
Non-Final Office Action, Dec. 23, 2011, U.S. Appl. No. 12/791,527, filed Jun. 1, 2010.
Final Office Action, Jul. 21, 2011, U.S. Appl. No. 12/791,527, filed Jun. 1, 2010.
Non-Final Office Action, Oct. 6, 2010, U.S. Appl. No. 12/791,527, filed Jun. 1, 2010.
Notice of Allowance, Apr. 24, 2013, U.S. Appl. No. 11/525,231, filed Sep. 21, 2006.
Final Office Action, Sep. 25, 2012, U.S. Appl. No. 11/525,231, filed Sep. 21, 2006.
Non-Final Office Action, Feb. 15, 2012, U.S. Appl. No. 11/525,231, filed Sep. 21, 2006.
Advisory Action, Oct. 31, 2011, U.S. Appl. No. 11/525,231, filed Sep. 21, 2006.
Final Office Action, Jul. 8, 2011, U.S. Appl. No. 11/525,231, filed Sep. 21, 2006.
Non-Final Office Action, Nov. 9, 2010, U.S. Appl. No. 11/525,231, filed Sep. 21, 2006.
Non-Final Office Action, Apr. 26, 2010, U.S. Appl. No. 11/525,231, filed Sep. 21, 2006.
Non-Final Office Action, Jun. 22, 2011, U.S. Appl. No. 11/659,858, filed May 14, 2007.
Final Office Action, Dec. 7, 2011, U.S. Appl. No. 11/659,858, filed May 14, 2007.
Non-Final Office Action, Jun. 22, 2004, U.S. Appl. No. 09/662,758, filed Sep. 15, 2000.
Non-Final Office Action, Apr. 28, 2005, U.S. Appl. No. 09/662,758, filed Sep. 15, 2000.
Final Office Action, Oct. 20, 2005, U.S. Appl. No. 09/662,758, filed Sep. 15, 2000.
Notice of Allowance, May 3, 2006, U.S. Appl. No. 09/662,758, filed Sep. 15, 2000.
Non-Final Office Action, Dec. 13, 2007, U.S. Appl. No. 11/071,706, filed Mar. 3, 2005.
Final Office Action, Oct. 6, 2008, U.S. Appl. No. 11/071,706, filed Mar. 3, 2005.
Non-Final Office Action, Jun. 9, 2009, U.S. Appl. No. 11/071,706, filed Mar. 3, 2005.
Final Office Action, Feb. 18, 2010, U.S. Appl. No. 11/071,706, filed Mar. 3, 2005.
Advisory Action, May 26, 2010, U.S. Appl. No. 11/071,706, filed Mar. 3, 2005.
Non-Final Office Action, Sep. 24, 2010, U.S. Appl. No. 11/071,706, filed Mar. 3, 2005.
Notice of Allowance, Feb. 9, 2011, U.S. Appl. No. 11/071,706, filed Mar. 3, 2005.
Final Office Action, Feb. 28, 2013, U.S. Appl. No. 12/606,603, filed Oct. 27, 2009.
Non-Final Office Action, May 25, 2012, U.S. Appl. No. 12/606,603, filed Oct. 27, 2009.
Non-Final Office Action, Sep. 3, 1999, U.S. Appl. No. 09/071,900, filed May 4, 1998.
Non-Final Office Action, Dec. 20, 2000, U.S. Appl. No. 09/071,900, filed May 4, 1998.
Final Office Action, Mar. 29, 2000, U.S. Appl. No. 09/071,900, filed May 4, 1998.
Action Action, Aug. 14, 2000, U.S. Appl. No. 09/071,900, filed May 4, 1998.
Final Office Action, Aug. 15, 2001, U.S. Appl. No. 09/071,900, filed May 4, 1998.
Non-Final Office Action, Mar. 12, 2002, U.S. Appl. No. 09/071,900, filed May 4, 1998.
Non-Final Office Action, Jul. 3, 2002, U.S. Appl. No. 09/071,900, filed May 4, 1998.
Non-Final Office Action, Jan. 2, 2003, U.S. Appl. No. 09/071,900, filed May 4, 1998.
Final Office Action, May 7, 2003, U.S. Appl. No. 09/071,900, filed May 4, 1998.
Advisory Action, Dec. 30, 2003, U.S. Appl. No. 09/071,900, filed May 4, 1998.
Non-Final Office Action, Apr. 22, 2004, U.S. Appl. No. 09/071,900, filed May 4, 1998.
Final Office Action, Jan. 13, 2005, U.S. Appl. No. 09/071,900, filed May 4, 1998.
Notice of Allowance, Jul. 13, 2005, U.S. Appl. No. 09/071,900, filed May 4, 1998.
Non-Final Office Action, Dec. 1, 2003, U.S. Appl. No. 09/965,747, filed Sep. 28, 2011.
Notice of Allowance, May 4, 2004, U.S. Appl. No. 09/965,747, filed Sep. 28, 2011.
Advisory Action, Sep. 19, 2013, U.S. Appl. No. 12/636,970, filed Dec. 14, 2009.
Final Office Action, Jul. 10, 2013, U.S. Appl. No. 12/636,970, filed Dec. 14, 2009.
Non-Final Office Action, Dec. 6, 2012, U.S. Appl. No. 12/636,970, filed Dec. 14, 2009.
Advisory Action, Nov. 19, 2013, U.S. Appl. No. 12/636,970, filed Dec. 14, 2009.
Non-Final Office Action, Feb. 6, 2014, U.S. Appl. No. 12/636,970, filed Dec. 14, 2009.
Notice of Allowance, Dec. 9, 2010, U.S. Appl. No. 11/953,569, filed Dec. 10, 2007.
Non-Final Office Action, Mar. 24, 2010, U.S. Appl. No. 11/953,569, filed Dec. 10, 2007.
Advisory Action, Jun. 17, 2013, U.S. Appl. No. 13/052,041, filed Mar. 18, 2011.
Final Office Action, Apr. 26, 2013, U.S. Appl. No. 13/052,041, filed Mar. 18, 2011.

(56) References Cited

OTHER PUBLICATIONS

Non-Final Office Action, Oct. 9, 2012, U.S. Appl. No. 13/052,041, filed Mar. 18, 2011.
Non-Final Office Action, Dec. 20, 2013, U.S. Appl. No. 13/052,041, filed Mar. 18, 2011.
Non-Final Office Action, Dec. 6, 2013, U.S. Appl. No. 13/175,783, filed Jul. 1, 2011.
Final Office Action, Jun. 12, 2013, U.S. Appl. No. 13/175,783, filed Jul. 1, 2011.
Non-Final Office Action, Nov. 23, 2012, U.S. Appl. No. 13/175,783, filed Jul. 1, 2011.
Non-Final Office Action, Apr. 2, 2012, U.S. Appl. No. 13/175,783, filed Jul. 1, 2011.
Non-Final Office Action, Dec. 24, 2013, U.S. Appl. No. 14/019,493, filed Sep. 5, 2013.
Non-Final Office Action, Jan. 10, 2014, U.S. Appl. No. 14/019,480, filed Sep. 5, 2013.
Non-Final Office Action, May 13, 2015, U.S. Appl. No. 13/007,445, filed Jan. 14, 2011.
Final Office Action, Jun. 4, 2015, U.S. Appl. No. 12/477,708, filed Jun. 3, 2009.
Non-Final Office Action, Mar. 26, 2015, U.S. Appl. No. 13/052,041, filed Mar. 18, 2011.
Non-Final Office Action, May 1, 2015, U.S. Appl. No. 14/019,493, filed Sep. 5, 2013.
Non-Final Office Action, Apr. 1, 2015, U.S. Appl. No. 14/519,077, filed Oct. 20, 2014.
Notice of Allowance, Feb. 3, 2016, U.S. Appl. No. 14/519,077, filed Oct. 20, 2014.
Notice of Allowance, Sep. 23, 2015, U.S. Appl. No. 13/007,445, filed Jan. 14, 2011.
Supplemental Notice of Allowability, Mar. 1, 2016, U.S. Appl. No. 14/519,077, filed Oct. 20, 2014.

\* cited by examiner

COMPUTER-IMPLEMENTED METHOD, COMPUTER SOFTWARE AND APPARATUS FOR USE IN A TRANSLATION SYSTEM

CROSS REFERENCE TO RELATED APPLICATIONS

This nonprovisional utility patent application is a continuation of, and claims the priority benefit of, U.S. patent application Ser. No. 11/525,231, filed on Sep. 21, 2006, entitled "Computer-Implemented Method, Computer Software and Apparatus for Use in a Translation System," (issued as U.S. Pat. No. 8,521,506 on Aug. 27, 2013) which is hereby incorporated by reference in its entirety, including all references cited therein.

FIELD OF THE INVENTION

This invention relates to a computer-implemented method, computer software and apparatus for use in natural language translation. In particular, the invention relates to a computer-implemented method, computer software and apparatus for improving the consistency of source content creation for use in natural language translation.

BACKGROUND OF THE INVENTION

Many organisations whose trade extends abroad desire documentation in numerous languages in order to provide the greatest possible coverage in the international marketplace. Modem communication systems such as the Internet and satellite networks span almost every corner of the globe and require ever increasing amounts of high-quality natural translation work in order to achieve full understanding between a myriad of different cultures.

As a rule of thumb, an expert human translator can translate approximately 300 words per hour, although this figure may vary according to the difficulties encountered with a particular language-pair. It would take a huge amount of manpower alone to cope with all the global translation needs of modem-day life. Clearly some assistance for human translators is needed in order for them to keep up with constantly evolving requirements and updates for countless web-pages, company brochures, government documents, and press articles, to name but a few areas of application.

With the ability to process vast amounts of information, computers naturally lend themselves to tackling the problem by way of machine translation. Various pure machine translators exist which can translate many thousands of words in a matter of seconds, but the success rates cannot be guaranteed. A human influence can be used somewhere in the machine translation process to provide the desired level of translation. Bridging the gap between purely human and purely machine translation are machine-assisted translation methods where the burden can be shared between a human translator and a computer, the human translator in such cases sometimes being referred to as a computational linguist.

It is estimated that currently only a third of current internet users are native English speakers. By 2010 it is expected that this fraction will fall to a quarter, so the need to write with international audiences in mind is growing increasingly important. Global organisations should provide communications which are consistent, regardless of which market they address or which language they communicate in, whether these communications are in the form of technical documentation, web pages or marketing collateral. Variations in such communications around the globe could cause confusion or mislead the public, which could lead to devaluation of brands or markets.

U.S. Pat. No. 6,047,299 describes a document composition supporting method and system for the support of document editing or translation using an electronic terminology dictionary which is composed such that terms in standard expression and terms in alternative spelling/expression corresponding thereto are registered in association with each other. The terminology dictionary is used to search an inputted document for terms in the document matching with terms in standard expression and terms in alternative spelling/expression registered in the terminology dictionary. For terminological standardisation of the document, the terms in the document matching with the terms in alternative spelling/expression inputted in the terminology dictionary are replaced by the corresponding terms in standard expression.

International patent application no. WO 02/29622 A1 describes a dynamic machine editing system incorporating a dynamic rules database. The dynamic database of editing rules helps to automate the editing of already-translated documents to better reflect the nuances of language content and meaning; and especially the use of nomenclature that is culture and/or industry specific. An initial set of editing rules is deployed in the database and used to edit machine-translated documents. Manual changes, which are subsequently made to the machine-edited documents by a human editor, are recorded and that data is used to form updates or additions to the initial editing rules.

Japanese patent application no. JP 2005/107597 describes a translation support system that uses an example database to search for examples of matching or similar sentences to an input sentence. A translation server which stores a number of bilingual sentence examples determines the similarity between pre-stored and input sentences based on the ratio of words in the stored sentences which match words in the input sentence. The results are then displayed to a translator for selection of a suitable pre-stored sentence whereby to assist with translation of the input sentence.

Machine-assisted translation methods, for example such as described in International patent application WO/2006 016171 A2 filed by the present applicants, still require considerable time on the part of the computational linguists involved. Any assistance that can be given to the computational linguists in their work is therefore desirable as this will lead to reductions in associated overall translation costs.

There is thus a need for a quick, efficient, easy-to-use and consistent machine-assisted natural language translation system which reduces the burden on computational linguists.

SUMMARY OF THE INVENTION

In accordance with a first aspect of the present invention, there is provided a computer-implemented method for use in natural language translation, said method comprising performing in software processes, the steps of:

comparing source material with stored material in a first natural language, said stored material having previously been translated from said first natural language to at least a second natural language;

identifying at least a part of said source material which has a relationship with at least a part of said stored material;

outputting said identified part of source material and said identified part of stored material in a form suitable for review by a user; and replacing said identified part of source material with said identified part of stored material to assist full translation of said source material from said first natural language to at least said second natural language.

Hence, by use of the present invention, a user, i.e. the person currently authoring the source material, can be made aware that source material they are currently authoring has some form of relationship with stored material that may have already be translated. The source material that is currently being authored can then be amended according to the stored material. Parts of the source material can be replaced with parts of the stored material which have the same or a similar meaning. Such content re-use means that when a full translation of the source material is required, the process is simpler and cheaper as some of the source material need not be translated again. The consistency of translation may also be increased in this manner as an author can adapt their authoring to source material that has previously been translated.

If such methods are adopted globally, then the cost and consistency benefits may increase accordingly. Adopting such methods early in the content creation process, i.e. during authoring of the source material, as opposed to later in the process once individual authors have pooled their source materials, can increase overall efficiency as the amount of editing can be reduced and content re-use reduces the volume of translation required. Such methods also help to maintain consistency of style and terminology across global markets.

Preferably, the replacing is carried out in response to input from a user. The user may thus choose to amend the source material they are currently authoring according to the identified stored material. The author may also choose to replace parts of the source material with parts of the stored material which have the same or a similar meaning.

Preferably, full translation of said source material from said first natural language to at least said second natural language is conducted with reference to said stored material which has previously been translated into at least said second natural language. Hence, full translation of the source material is facilitated as parts of the source material which have previously been translated need not be translated again during full translation of the source material.

The step of conducting full translation of said source material from said first natural language to at least said second natural language may comprise a human translator translating parts of said source material which were not replaced after having been identified as having a relationship with parts of said stored material. Hence, parts of source material which have not been previously translated can be translated by a human translator.

Alternatively, or in addition, the step of conducting full translation of said source material from said first natural language to at least said second natural language may comprise a machine translation process translating parts of said source material which were not replaced after having been identified as having a relationship with parts of stored material. Hence, parts of source material which have not been previously translated can be translated by a machine translation process.

Alternatively, or in addition, the step of conducting full translation of said source material from said first natural language to at least said second natural language may comprise a machine-assisted translation process in which a human translator and a machine translation process are used to translate parts of said source material which were not replaced after having been identified as having a relationship with parts of said stored material. Hence, parts of source material which have not been previously translated can be translated by a human translator and a machine translation process.

Preferably, a full translation of said source material is output in a form suitable for review by a user. The full translation can thus undergo a review by a user. The user conducting the review of the full translation may be the same person as the human translator, or alternatively may be a different person, in which case it may undergo transmission over a data communications link.

Preferably, the parts of said full translation which were translated with reference to said stored material which had previously been translated into at least said second natural language, parts of said full translation which were translated by a human translator and/or parts of said full translation which were translated by a machine translation process and/or parts of said full translation which were translated by a machine-assisted translation process are outputted in different forms, for example if different colours can be used for each form. A reviewer is thus able distinguish between parts of the translation which have been translated in different ways and the review process can be made more efficient.

Preferably said stored material comprises at least one translation memory.

Preferably the at least one translation memory contains a plurality of stored segment pairs, each of said stored segment pairs comprising source material in said first natural language and corresponding translation in at least said second natural language. A translation memory is used to store segment pairs which have previously been translated from a first natural language into at least a second natural language. The content of a translation memory can then be re-used to facilitate later translations.

Preferably, each of the stored segments pairs corresponds to at least one of a paragraph, a sentence, or a phrase. Hence, if a matching or similar paragraph cannot be found in the stored material, then a matching or similar sentence may be found. Similarly, if a matching or similar sentence cannot be found in the stored material, then a matching or similar phrase may be found.

Preferably, the source material is divided into a plurality of source segments prior to said comparison of said source material with said stored material. Hence source segments rather than the whole material can be compared with the stored material.

Preferably, said plurality of source segments are compared with said stored material in said first natural language from said plurality of stored segments.

Preferably, said identified part of source material comprises one or more of said plurality of source segments.

Preferably, said source material is processed by dividing it into said source segments where at least one of a full stop, an exclamation mark, a question mark, a colon, a semicolon, a tab character, or a paragraph mark appears in said source material. Hence boundaries between successive segments can be made in the source material where such characters/marks appear. Alternatively, a user may define characters/marks or such like for boundaries between successive segments or may choose the location of the boundaries themselves in the source material.

Preferably, the method comprises comparing said source material with preferred terminology material.

Preferably, said replacement comprises replacing a part of said source material with a part of said preferred terminology material.

The preferred terminology material could for example include terminology that accords to company standards or accepted regional norms or such like. The author can be alerted if parts of the source material they are currently authoring have some form of relationship with preferred terminology material. The source material currently being authored may then be amended according to the preferred terminology material, thus helping to increase the consistency of content and/or style of the source material with previously approved content. The adoption at the authoring stage of preferred terminology that has previously been translated also has the benefit of reducing the amount of translation required when a full translation of the source material is carried out.

Preferably, said method comprises comparing said source material with forbidden terminology material.

Preferably, said replacement comprises replacing a part of said source material with a part of said preferred terminology material.

The list of forbidden terminology could for example include terminology used by competitors, or which may cause offence or confusion, or damage a company's reputation or brand. The author can be alerted if parts of the source material they are currently authoring have some form of relationship with forbidden terminology material. The forbidden terminology material may thus be replaced with material from the list of preferred terminology at the authoring stage, thus helping to increase the consistency of the source material. This also avoids the inefficiency of the forbidden terminology material being unnecessarily translated and then having to be corrected in translated form.

Preferably said method comprises comparing said source material with a set of options. These options may include grammatical options. Alternatively, or in addition, the options may include stylistic options.

Preferably, said replacement comprises replacing a part of said source material according to at least one option from said set of options.

Preferably, said set of options comprises at least one of a spelling variant, an abbreviation, a contraction, a compound word, punctuation, the length of a sentence, a commonly misused word, unnecessary wording, or a combination of specific characters.

Preferably, at least one of said options is user configurable. This may involve a user choosing which options are used with the content they are currently creating, or a user choosing settings for one or more of the options differently to default settings. This may also involve a user defining their own options.

The options provide a user with the ability to select and configure a number of checks or rules that can be applied to the source material. The checks can help a user to author the source material such that it is consistent with corporate authoring standards or preferences at the authoring stage.

The options may involve the way in which words and punctuation appear in the source material. One example of option may relate to spelling variants so that a user may choose either British- or American-English spelling. Other such options may relate to the use of abbreviations, contractions or compound words.

The options may involve the clarity and conciseness of the source material. An example of such an option may relate to the length of sentences, commonly misused words, or unnecessary wording that can be removed. An option may also relate to a regular expression which could be used for example to check for a specific combination of characters in the source material.

Preferably, the relationship comprises a correlation between said identified part of source material and said identified part of stored material. The correlation could be an exact match, or less strictly could indicate similarities between the source material and stored material.

Preferably, the correlation comprises a correlation of at least a predetermined level.

Preferably, the predetermined level is user definable. A user may thus adjust the predetermined level according to how closely the user requires the match between the stored material and the source material to be. Typical values may for example range from a relatively low 75% level to a relatively high 95% level, depending on the amount and preciseness of matched or similar stored material the user wishes to review. If a user finds that a relatively low level, for example 70%, is producing too many similar results, then the user may adjust the level for example to 90% such that the results are more manageable.

Preferably, said correlation comprises a fuzzy logic match. Fuzzy logic techniques can thus be employed to produce a measure of how closely the compared source and stored material matches.

Preferably, said outputting further comprises outputting data associated with said relationship. Data associated with the relationship can be output in order to give some indication to a user of the nature of the relationship identified between parts of the source and stored material. This could involve for example, highlighting the common or different words and/or displaying a correlation coefficient or a fuzzy logic match percentage.

Preferably, said source material is input into a first software process by a user. The first software process may have some form of text editing functionality, such as provided by word processing software.

Preferably, said outputting and replacing steps are carried out by said first software process. Hence a user is presented with identified source and stored material by the word processing software they are currently authoring the content in. This will allow the user to see the effect that replacement of any source material with stored material will have on the content they are currently authoring.

Preferably, said comparing and identifying steps are carried out by a second software process. The second software process can be a separate process to the first software process such that the invention can be used with many of the commercially available word processing software packages without the need for customisation.

Preferably, said first software process interfaces with said second software process via an Application Program Interface (API). The second software process is thus able to communicate with the first software process via an API provided for such purposes with the first software process.

Preferably, said stored material is accessed by said second software process. Hence stored material can be searched and retrieved by the second software process and passed to the first software process where necessary.

In accordance with a second aspect of the present invention, there is provided a computer program product comprising a computer-readable medium having computer readable instructions recorded thereon for natural language translation, the computer readable instructions being operative, when performed by a computerized device, to cause the computerized device to perform a method comprising:

comparing source material with stored material in a first natural language, said stored material having previously been translated from said first natural language to at least a second natural language;

identifying at least a part of said source material which has a relationship with at least a part of said stored material;

outputting said identified part of source material and said identified part of stored material in a form suitable for review by a user; and replacing said identified part of source material with said identified part of stored material to assist full translation of said source material from said first natural language to at least said second natural language.

In accordance with a third aspect of the present invention, there is provided apparatus for use in natural language translation, the apparatus including one or more computing platforms being collectively programmed with a plurality of components, the components being co-operative to perform a method comprising:

comparing source material with stored material in a first natural language, said stored material having previously been translated from said first natural language to at least a second natural language;

identifying at least a part of said source material which has a relationship with at least a part of said stored material;

outputting said identified part of source material and said identified part of stored material in a form suitable for review by a user; and replacing said identified part of source material with said identified part of stored material to assist full translation of said source material from said first natural language to at least said second natural language.

Further features and advantages of the invention will become apparent from the following description of preferred embodiments of the invention, given by way of example only, which is made with reference to the accompanying drawings.

DETAILED DESCRIPTION OF THE INVENTION

Figure 1:
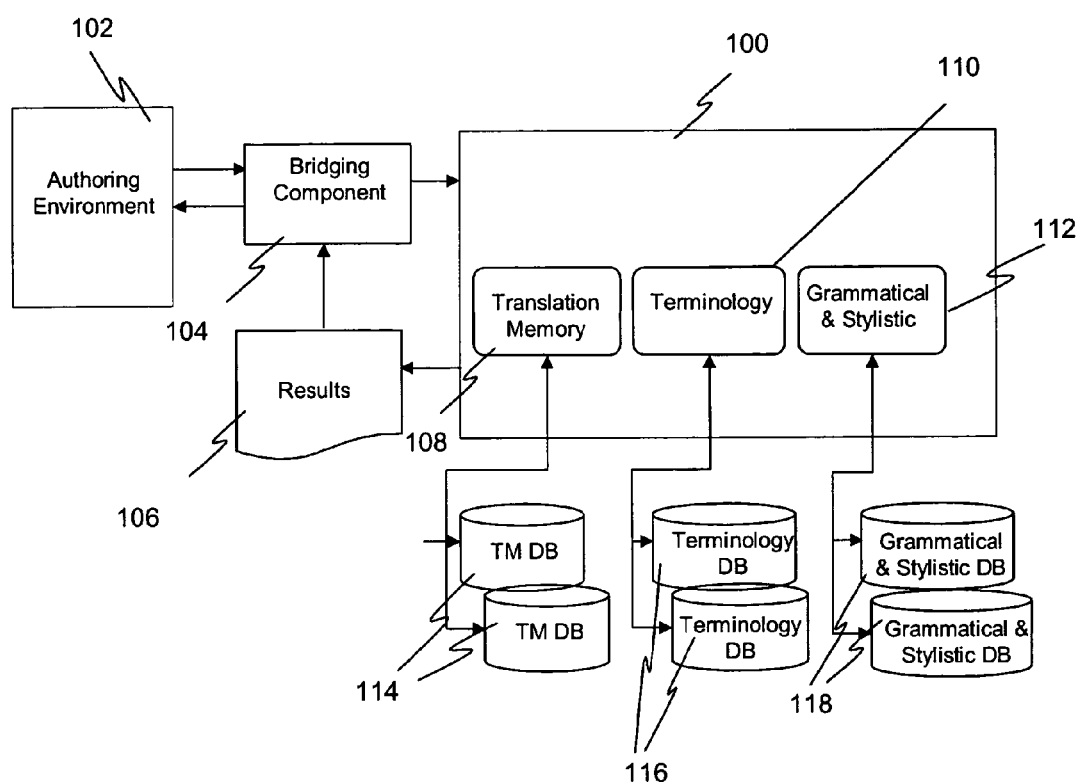
FIG. 1 is a schematic system diagram according to an embodiment of the invention.

A schematic system diagram according to an embodiment of the invention is shown in FIG. 1. Each of the components may be implemented and run on a common computing platform, or may be distributed amongst different computing platforms. By computing platform, here we mean a personal computer, server, or other type of computerized device which typically includes memory, a processor, and input/output interface circuitry. As shown in FIG. 1, the system includes a core component 100 which includes a translation memory sub-component 108, a terminology sub-component 110 and a grammatical and stylistic sub-component 112. The core component 100 has access to a number of stored material databases which include one or more translation memory databases 114, one or more terminology databases 116, and one or more grammatical and stylistic databases 118. The core component 100 interfaces with an authoring environment 102 via a bridging component 104.

The authoring environment 102 may be word processing software or such like which allows a user to author and edit source material such as text. The user creates the content, hereinafter referred to as source material, in one natural language, with a view that the content may well be subsequently translated into one or more other natural languages. The authoring environment may comprise a first software process. The authoring environment 102 may for example be software such as Microsoft Word®, Adobe Framemaker®, Blast Radius XMetal® Author or Arbortext Editor™.

The bridging component allows communication between the authoring environment 102 and the core component 100. The core component 100 may comprise a second software process.

When a user initiates an authoring check, source material currently being created is passed from the authoring environment 102 via the bridging component 104 to the core component for processing. The results 106 of the check are then passed back from the core component 100 to the authoring environment 1 O~ via the bridging component 104 for review by the user. The operation of the bridging component 104 will be described in more detail with reference to FIG. 3 below.

The core component 100 is responsible for the main data processing function of the invention. It may be in the form of a desktop software application running on a user's personal computer or similar computing device. Alternatively the core component may consist of an application hosted on a server with the user using a dumb terminal with all or the majority of processing being carried out by the server.

When the core component receives source material it compares it to material which has previously been stored in one or more databases, hereinafter referred to as stored material. The core component identifies parts of the source material which have a relationship with parts of the stored material. The identified stored material is then passed back to the authoring environment 102 which is then output for review by the user in the form of a proposed edit of the source material.

Data associated with the identified relationship may also be passed back to the authoring environment and used to indicate to the user the nature of the identified relationship. This data may for example relate to which words or phrases in the source material match or are similar to words or phrases in the identified stored material. Alternatively, or additionally the data associated with the relationship may include a metric indicating how close the relationship is, for example a correlation coefficient or percentage.

The user may now review the identified source material, the identified stored material and, optionally, data relating to the identified relationship between the source and stored material and decide whether to edit the source material accordingly. If the user decides to edit the source material according to the proposal, then the identified part of the source material is replaced with the stored material.

The core component 100 includes three different sub-components 108, 110 and 112, which each are responsible for performing different authoring checks with different data processing functions. A user can choose to perform an authoring check using one or more of the subcomponents, each of which is described below in turn.

The authoring checks may be carried out on source material in succession or concurrently. Preferably, the translation memory check is carried out before the terminology or grammatical and stylistic checks.

The translation memory sub-component 108 has access to one or more translation memory databases (TM DB) 114, which may be local, network-based or server-based. The translation memory databases 114 contain stored material which has previously been translated from a first natural language to at least one other natural language. The stored source material may be general translation memory data for all users or, more commonly, may be specific to one user or one technical field for example.

The translation memory sub-component check involves comparing source material with stored source material and identifying any parts of the source material which have a relationship with parts of the stored material. When presented with the results, i.e. the stored material identified as having a relationship with the source material, from the translation memory subcomponent, the user can decide whether to replace parts of the source material with parts of the stored material. When a full translation of the source material is subsequently carried out, no translation of the replaced parts of the source material is required. This means that the workload associated with and time required to complete the full translation can be reduced and overall translation costs lowered due to the re-use of previously translated material.

The terminology sub-component 110 has access to one or more terminology databases (Terminology DB) 116, which may be local, network-based or server-based. The terminology databases contain stored material which relates to terminology which has previously been used by a user or is of a form suitable for inclusion by a user, hereinafter referred to as preferred terminology material. Preferred terminology material may be terminology which accords to company authoring guidelines or to accepted regional language customs or such like. The terminology databases also contain stored material which is not suitable for inclusion by the user, hereinafter referred to as forbidden terminology material. Forbidden terminology material is terminology which for one or more reasons should not be used by the user, for example because it is used by competitors or because it may be offensive to some readers.

The terminology sub-component check involves comparing the source material to the stored material and identifying parts of the source material which have a relationship with parts of the stored material. When presented with the results from the terminology sub-component, a user can decide whether to replace parts of the source material with parts of the stored material. By such replacement of the source material, the author can produce content which is more consistent with previously authored content, for example using the same term for a feature which has previously been used by a user or a company as a whole. This can help to prevent confusion caused by differing wordings being used to refer to the same features for example. A further advantage here is that the terminology may have already been translated previously which reduces associated translation workload and costs and further increases the consistency of the full translation.

The terminology sub-component 110 is able to identify forbidden terminology to a user who may then edit the source material to remove it. The editing may be according to preferred terminology identified by the terminology sub-component which is proposed to the user as a potential way in which the source material could be edited.

The grammatical and stylistic sub-component 112 has access to one or more grammatical and stylistic databases (Grammatical and stylistic DB) 118, which may be local, network-based or server-based. The grammatical and stylistic databases 118 contain stored material which relates to a set of grammatical and stylistic options which the user may wish to have the source material checked for. The user can configure the grammatical and stylistic sub-component 112 to include any number of options from the set during a check of the source material. Each option may have a default setting and may be further configured by the user.

The grammatical and stylistic options may involve features that directly concern the way in which words and punctuation appear in the source material. This allows consistent application of writing conventions or rules, whether accepted universally or specifically in a certain technical field, or in a certain language or country for example.

One example of a grammatical option may relate to spelling variants so that a user may choose to check for either British- or American-English spelling. If the user wishes to author in British-English, then the grammatical and stylistic sub-component can be configured such that the grammatical and stylistic sub-component 112 identifies parts of the source material which use American-English spelling with reference to rules stored in the grammatical and stylistic database(s). The grammatical and stylistic sub-component can then propose British-English versions from the stored material to replace the American-English spelling in the source material.

Another example of a grammatical option may relate to the use of abbreviations, as the user may wish to allow or not allow abbreviations in the source material. In a similar manner to the spelling variants option, the grammatical and stylistic sub-component can then propose replacement versions with or without abbreviations from the stored material, for example using "F AQ" instead of "Frequently asked questions."

Another example of a grammatical option may relate to the use of contractions, for example allowing use of "isn't" instead of "is not."

Another example of a grammatical option may relate to the use of compound words, for example using "world-wide" or "worldwide".

Stylistic options may involve the clarity and conciseness of the source material currently being authored.

An example of such a stylistic option may relate to the length of sentences, for example allowing a minimum sentence length of two words and a maximum sentence length of 25 words.

Another such stylistic option may relate to contextually commonly misused words, for example the use of 'accept' instead of 'except' in certain contexts.

Another such stylistic option may relate to unnecessarily long wording or "padding" in the source material which could be replaced without changing the semantics of the source material to any great extent. This may for example allow for the words "at the present time" to be replaced by the word "now."

Another stylistic option may relate to a regular expression which could be used for example to check for a specific combination of characters in the current source material.

Configuration settings for a user or groups of users can be stored in configuration profile files for subsequent use. Such configuration profile files can be distributed or made available centrally to a number of users leading to easier management and increased consistency in the use of options between different users in natural language translation projects.

Figure 2:
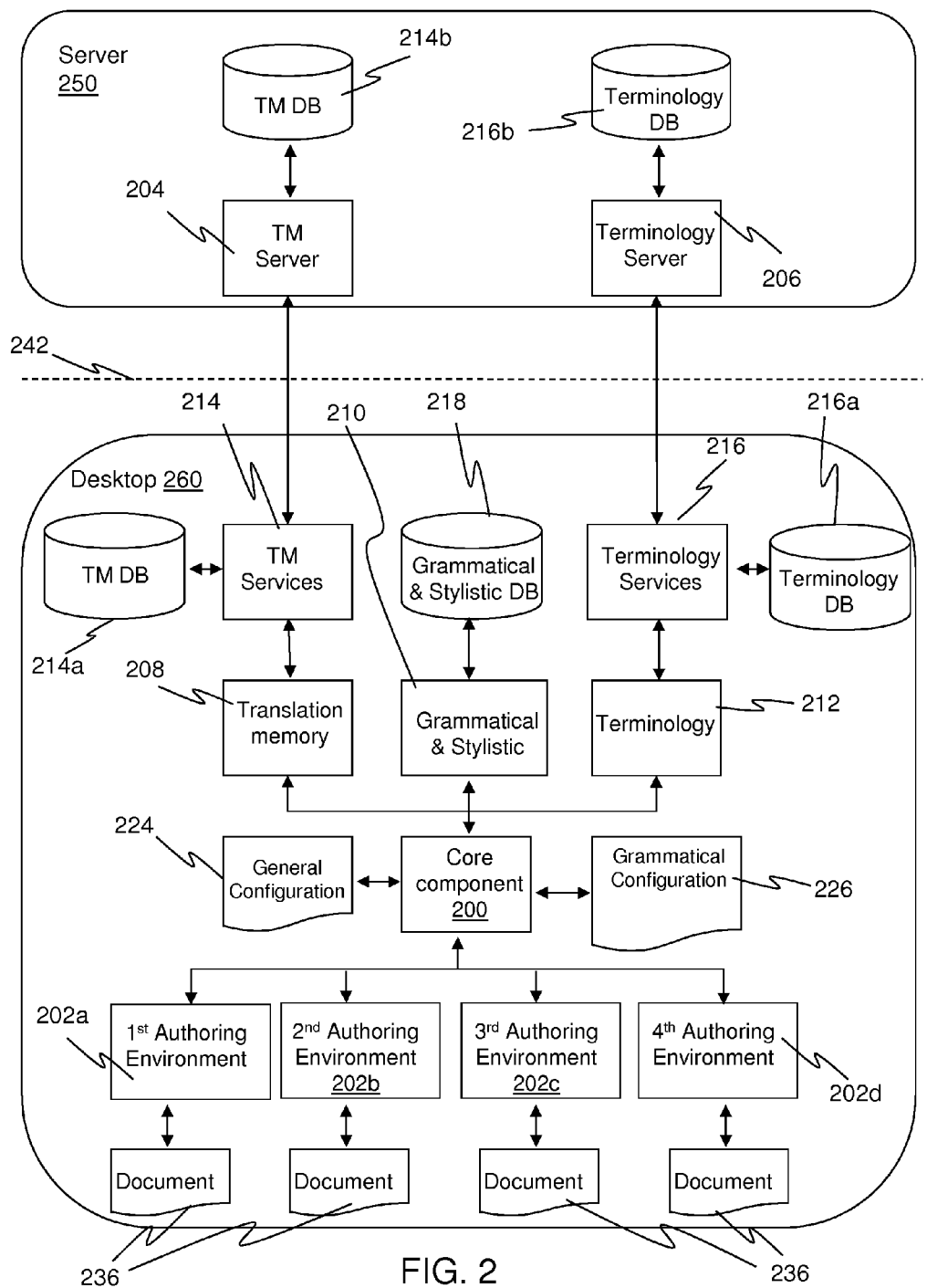
FIG. 2 is a diagram showing desktop and server components according to an embodiment of the invention.

FIG. 2 is a diagram showing desktop and server components according to an embodiment of the invention. In this embodiment, the invention includes a number of desktop components 260 local to each user and a number of server components 250 located remote to the users.

On the desktop side, the core data processing part 200 interfaces with a general configuration part 224. This allows the user to configure general settings such as listing the databases that the core data processing part 200 may access and user authentication information. The core data processing part also interfaces with a grammatical and stylistic options configuration part 226. This allows configuration of settings relating to the grammatical and stylistic options sub-component 210, for example abbreviations, contractions, etc.

The core data processing part 200 has further interfaces with one or more authoring environments, including for example, first Authoring environment 202a, second Authoring environment 202b, third Authoring environment 202c, fourth Authoring environment 202d, each of which has an associated current source material document 236. These could for example be Word, Arbortext, XMetal and Framemaker, or any other such software package. The user may be currently authoring source material in one or more of the authoring environments and there may be more than one document (not shown) currently being authored in each authoring environment.

The core data processing part 200 also interfaces with a translation memory subcomponent 208, a grammatical and stylistic sub-component 210 and a terminology sub-component 212, as described above with reference to FIG. 1.

The translation memory sub-component 208 has a services interface 214 which interfaces with stored material available in the form of one or more translation memory databases. The stored material in the translation memory databases may be accessed either concurrently or in turn during the comparing, identifying and outputting steps of the invention as described above with relation to FIG. 1.

The translation memory databases may include a desktop translation memory database 214a which is located on a storage device local to the user, connected either directly to the user's personal computer or via a local area network (LAN). The user may also have access to other remote translation memory databases, for example a server-based translation memory database 214b accessed via a network 242, such as the internet or ~m intranet, through a server 204. There may be further translation memory databases accessible via the network 242 (not shown).

Similarly to the translation memory sub-component 208, the terminology sub-component 212 has a services interface 216 which interfaces with stored material available to the user in the form of one or more terminology databases (denoted 'Terminology DB' in FIG. 2). The stored material in the terminology databases can be accessed either concurrently or in turn during the comparing, identifying and outputting steps of the invention as described above with relation to FIG. 1. The terminology databases may include a desktop terminology database 216a which is located on a storage device local to the user, connected either directly to the user's personal computer or via a local area network (LAN). The user may also have access to other remote terminology databases, for example a server-based terminology database 216b accessed via network 242, through a server 206. There may be further translation memory databases accessible via network 242 (not shown).

In alternative embodiments, servers 204 and 206 may be the same server, translation memory database 214b and terminology database 216b may be combined into the same database and/or translation memory database 214a and terminology database 216a may be combined. In further alternative embodiments, any of the components on the desktop may be hosted at a remote server, with the desktop including a terminal capable of interfacing with the remote server.

The grammatical and stylistic sub-component 210 has access to one or more local and/or remote grammatical and stylistic options databases 218 in a similar manner to that described for the translation memory and terminology sub-components 208, 212, the operation of which will be clear in view of the foregoing similar descriptions.

Figure 3:
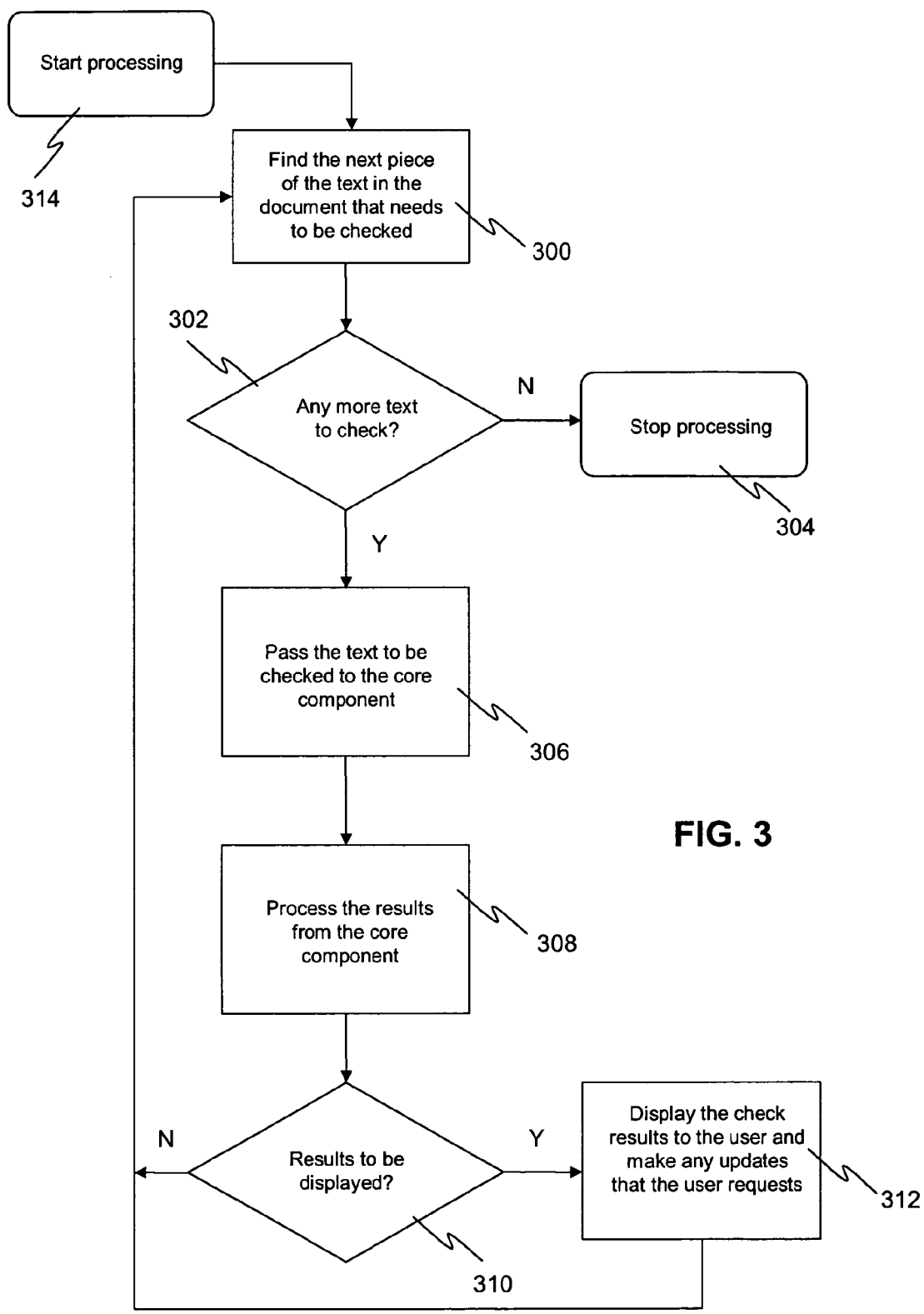
FIG. 3 is a flowchart showing the operation of the bridging component according to an embodiment of the invention.

FIG. 3 is a flowchart showing the operation of the bridging component according to an embodiment of the invention. As described above with relation to FIG. 1, the bridging component 104 allows the (or each) authoring environment 102 to communicate with the core component 100. A user may initiate an authoring check for the entire source material they are authoring or just a selection of the source material, for example a part of the source material, i.e. a portion of text, which the user may select.

The bridging component 104 starts processing in step 314 when it receives a notification from the authoring environment 102 that an authoring check should be carried out. The bridging component 104 then finds the next part of the source material, i.e. the next piece of text, to be checked in step 300. This may be a highlighted paragraph or sentence, for example.

The bridging component checks in step 302 whether there is another part of the current source material to be checked. If there is another part of the source material to be checked, the bridging component 104 passes, in step 306, the next part of the source material to be checked to the core component 100. When the core component has finished processing, i.e. checked that part of the source material, the core component passes the results 106 of the authoring check back to the bridging component 104. The results 106 may include any stored material that has been identified as having a relationship with the part of the source material that has been checked, and may also include data relating to the identified relationship between the stored material and the source material. The results are then processed in step 308 by the bridging component 104. The processing will determine 310 whether any stored material and relationship data needs to be passed to the authoring environment 102 for review by the user.

If there is stored source material and relationship data to be displayed, this is displayed to the user for review in step 312 and the user may accept or reject any proposed changes to the source material and the process returns to step 300 where the bridging component finds the next part of the current source material to be checked.

If there is no stored source material and relationship data to be displayed, the process returns to step 300 where the bridging component finds the next part of the source material to be checked.

The above process continues until during step 302 the bridging component determines there are no more parts of the source material to be checked and processing stops in step 304.

The bridging component may be implemented using an Application Programming Interface (API). An API can be defined as an interface that enables one or more computer programs to use facilities provided by one or more other computer programs, whether by calling those programs, or by being called by them. Thus in the present invention, an API can be used to allow communication of a first software process, i.e. an authoring environment 102, with a second software process, i.e. a core component 100.

In an alternative embodiment, the bridging component may be a separate software process to the first and second software processes (authoring environment and core component respectively). Further alternatively, the bridging component may form part of the second software process.

Figure 4:
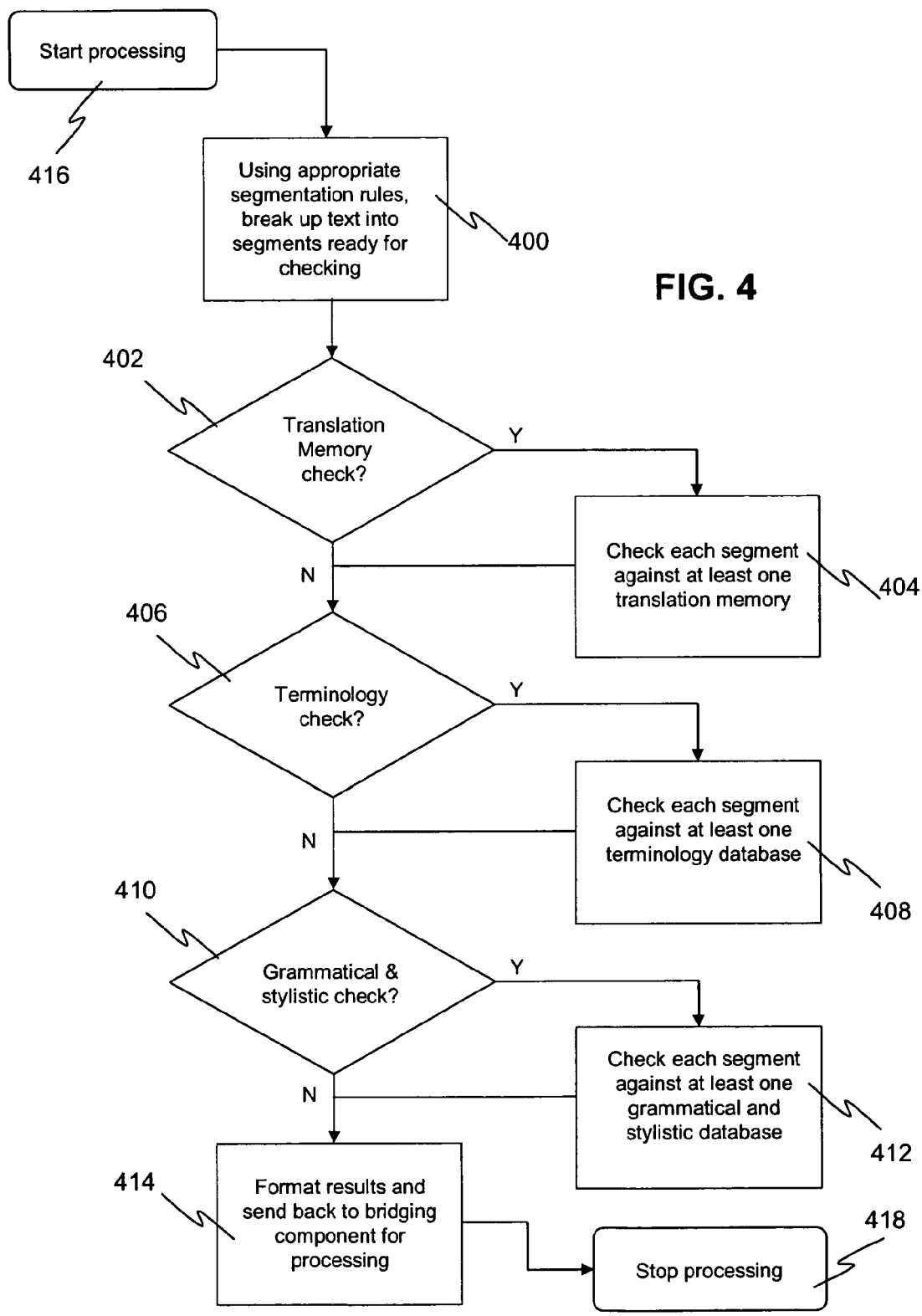
FIG. 4 is a flowchart showing the operation of the text checking component according to an embodiment of the invention.

FIG. 4 is a flowchart showing the operation of the text checking component according to an embodiment of the invention. This flowchart gives an overview of the steps carried out when the bridging component 104 notifies the core component 100 that an authoring check of a part of source material should be carried out.

The core component 100 starts processing in step 416 when it receives a part of source material from the bridging component 104 upon which an authoring check should be carried out. Using appropriate segmentation rules, the core component divides up the part of source material into segments in step 400 ready for checking. The segments may for example be paragraphs, sentences, phrases or words. The nature of the segmentation will depend on the nature of the stored source material that the current source material is to be checked against.

In an alternative embodiment, segmentation may be carried out by the bridging component so that the core component receives source material that has already been segmented.

Segmentation involves analysing the source material and dividing it up into segments according to one or more segmentation rules. The segmentation rules may be predetermined and may be user configurable. The division between segments may be determined according to punctuation present in the source material. For example it could be based on punctuation such as a full stop, a semicolon, a colon, a question mark, an exclamation mark, a tab character; or a paragraph mark. A user may specify segmentation rules which take a segment's context into consideration and may affirm or reject divisions between segments. Such rules may operate on spaces, abbreviations, the number and nature of leading and trailing characters and words, and also take user-specified lists into account (such as abbreviation lists or lists of words which may follow ordinal numbers).

In step 402 the core component determines whether the requested check is for a translation memory authoring check. If a translation memory authoring check has been requested, the translation memory sub-component 108 carries out the translation memory check authoring in step 404 to identify stored material which has a relationship with the source material being checked.

In step 406 the core component determines whether the requested check is for a terminology authoring check. If a terminology authoring check has been requested, the terminology sub-component 110 carries out the terminology authoring check in step 408 to identify any stored material which has a relationship with the source material being checked.

In step 410 the core component determines whether the requested check is for a grammatical and stylistic authoring check. If a grammatical and stylistic authoring check has been requested, the grammatical and stylistic sub-component 112 carries out the grammatical and stylistic authoring check in step 412 to identify any stored source material which has a relationship with the source material being checked.

In step 414, the results of any of the translation memory, terminology or grammatical and stylistic checks are arranged in a suitable form and passed back to the bridging component for processing. The core component then finishes processing of the authoring check for the source material in step 418.

Figure 5:
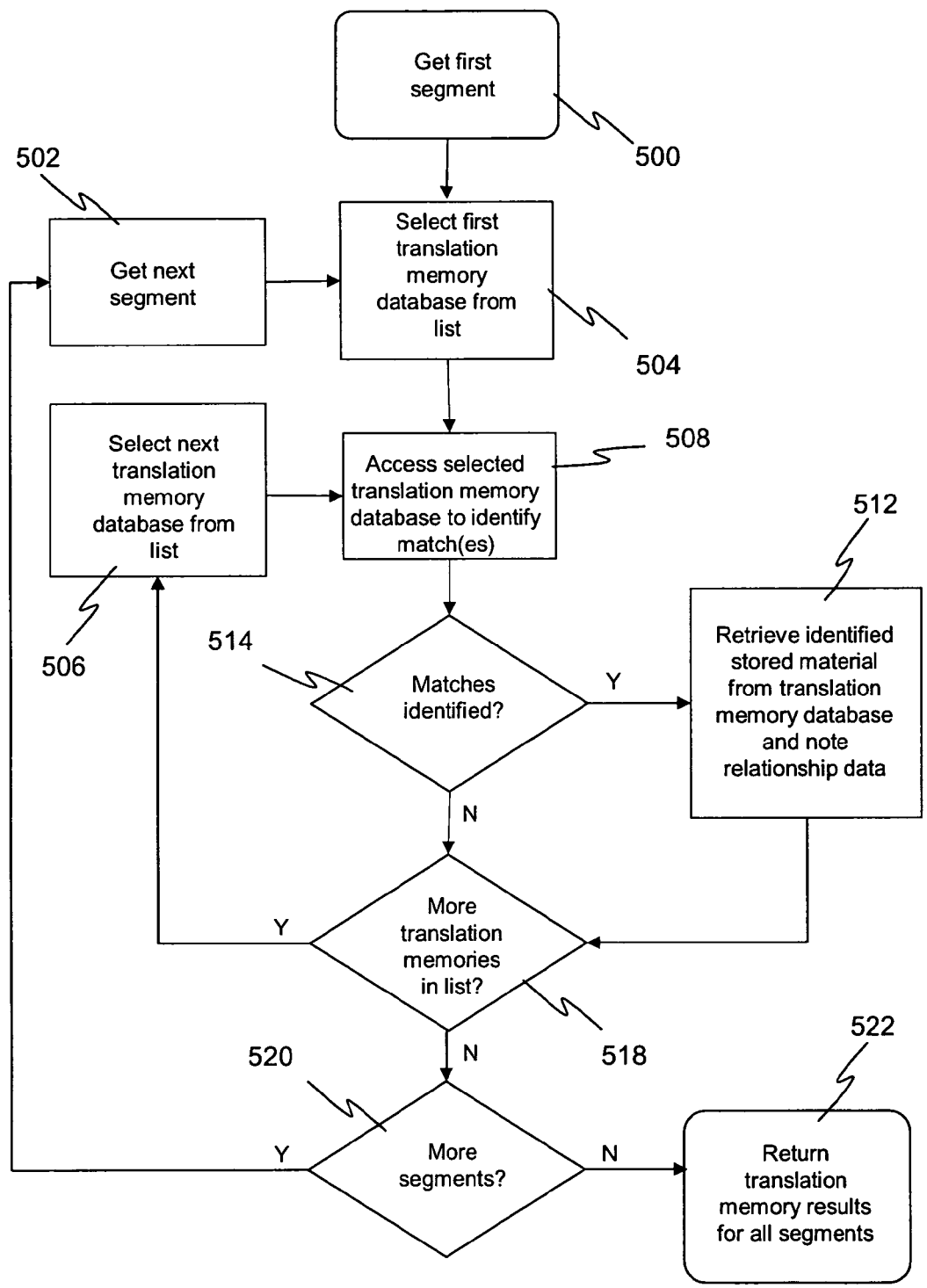
FIG. 5 is a flowchart showing the steps involved in a translation memory authoring check according to an embodiment of the invention.

FIG. 5 is a flowchart showing the steps involved in a translation memory authoring check according to an embodiment of the invention. This flowchart gives more detail on the steps carried out when the translation memory sub-component 108 carries out a translation memory authoring check for each part (for example, each segment) of source material being checked, according to step 404 of FIG. 4.

In step 500 of FIG. 5, the translation memory sub-component 108 receives the first segment of source material to be checked from the bridging component 104 via the core component 100. The first translation memory database from a list of translation memory databases that the translation memory sub-component 108 is configured for is selected in step 504. This could for example be the desktop translation memory database 214a shown in FIG. 2. The translation memory sub-component 108 then accesses the selected translation memory database in step 508 to identify any matches, i.e. stored material which has a relationship with the segment of source material being checked. The translation memory sub-component 108 can be configured to identify, as shown in step 514, the closest match, which may be an exact match, or a number of the closest matches which are similar to the part being checked.

If there is an exact match, then the exactly matching stored material may be retrieved from the translation memory database or alternatively, the fact that an exact match has been found may be noted as shown in step 512.

If an exact match has not been identified, the translation memory sub-component may have identified stored material which is similar to the part being checked, for example a fuzzy match. In this case the similar stored material is retrieved in step 512 along with the data associated with the identified relationship, for example the level of the fuzzy match. This data could be in the form of a percentage calculated using the number of matching and non-matching words for example.

The translation memory sub-component 108 then checks to see if there are any more configured translation memory databases to be checked in step 518.

If there are more translation memories to be checked, the next one in the list of configured translation memories is selected in step 506. This may for example be the server-based translation memory database 214b shown in FIG. 2. Steps 508, 514, 512, 518 and 506 are then repeated accordingly for this and any further configured translation memories.

The translation memory sub-component 108 then determines whether there are any more segments of the source material to be checked in step 520, in which case, the next segment is obtained from the bridging component 104 via the core component 100 in step 502 and the process repeats as above. If there are no more segments to be checked, then any identified results and data relating to any identified relationships are returned to the core component 100, which in turn passes these on to the bridging component 104 in a suitable format.

Figure 6:
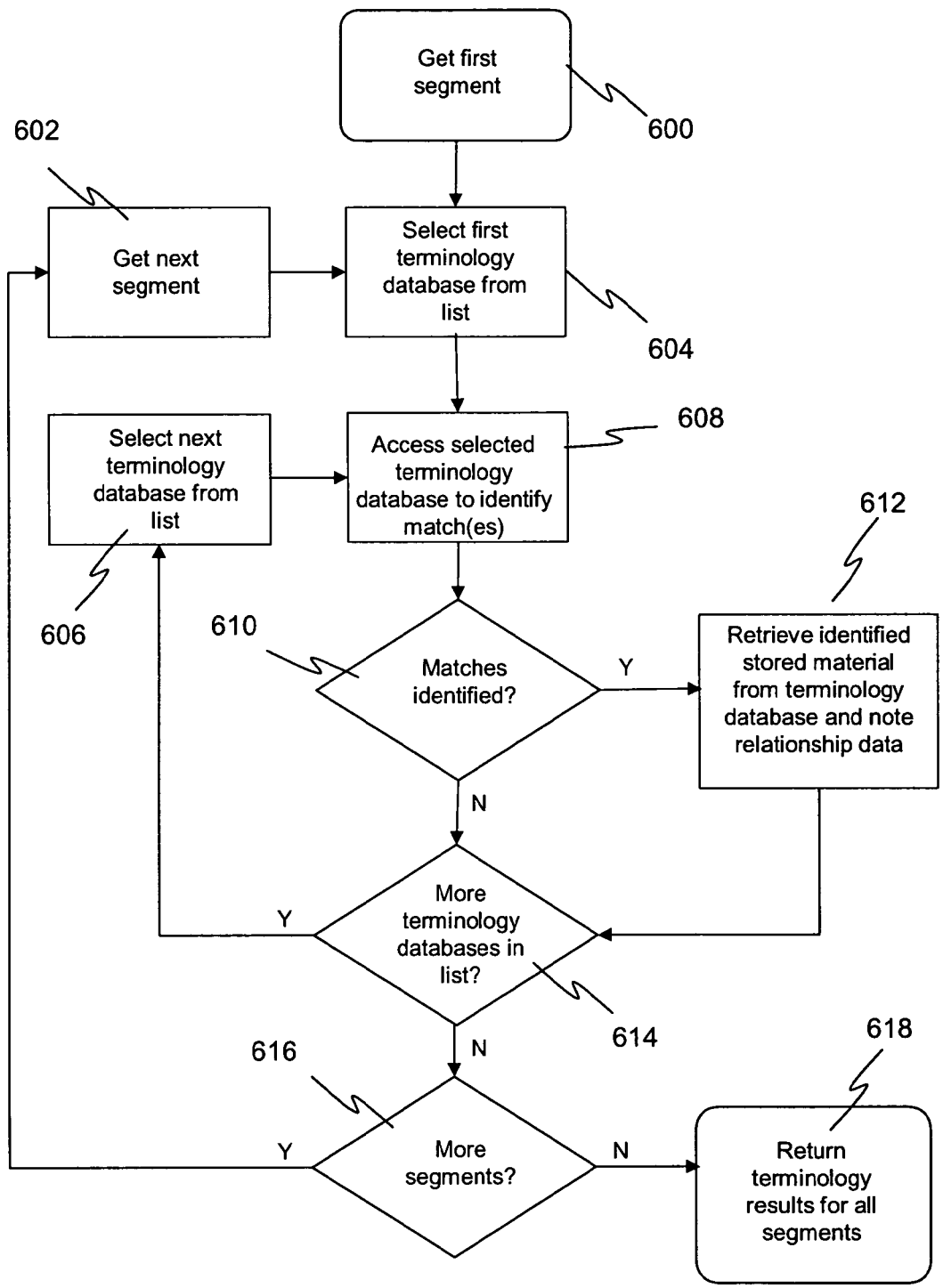
FIG. 6 is a flowchart showing the steps involved in a terminology authoring check according to an embodiment of the invention.

FIG. 6 is a flowchart showing the steps involved in a terminology authoring check according to an embodiment of the invention. This flowchart gives more detail on the steps carried out when the terminology sub-component 110 carries out a terminology authoring check for each part (for example, each segment) of source material being checked, according to step 408 of FIG. 4.

In step 600 of FIG. 6, the terminology sub-component 110 receives the first segment of source material to be checked from the bridging component 104 via the core component 100. The first terminology database from a list of terminology databases that the terminology subcomponent 110 is configured for is selected in step 604. This could for example be the desktop terminology database 216a database shown in FIG. 2. The terminology sub-component 110 then accesses the selected terminology database in step 608 to identify any matches, i.e. stored material which has a relationship with the segment of source material being checked. The terminology sub-component 110 can be configured to identify, as shown in step 610, the closest match, which may be an exact match, or one or more of the closest matches which are similar to the segment being checked. Any matches are retrieved in step 612 in a similar manner to that described above for the translation memory sub-component.

The terminology sub-component 110 then checks if there are more terminology databases to be checked in step 614.

If there are more terminology databases to be checked, the next one in the list of configured terminology databases is selected in step 606. This may for example be the server-based terminology database 216b shown in FIG. 2. Steps 608, 610, 612, 614 and 606 are then repeated accordingly for any further configured terminology databases.

The terminology sub-component 110 then determines whether there are any more segments of the source material to be checked in step 616, in which case, the next segment is obtained from the bridging component 104 via the core component 100 in step 602 and the process repeats as above. If there are no more segments to be checked, then any identified results and data relating to any identified relationships are returned to the core component 100 which passes these on to the bridging component 104 in a suitable format.

Figure 7:
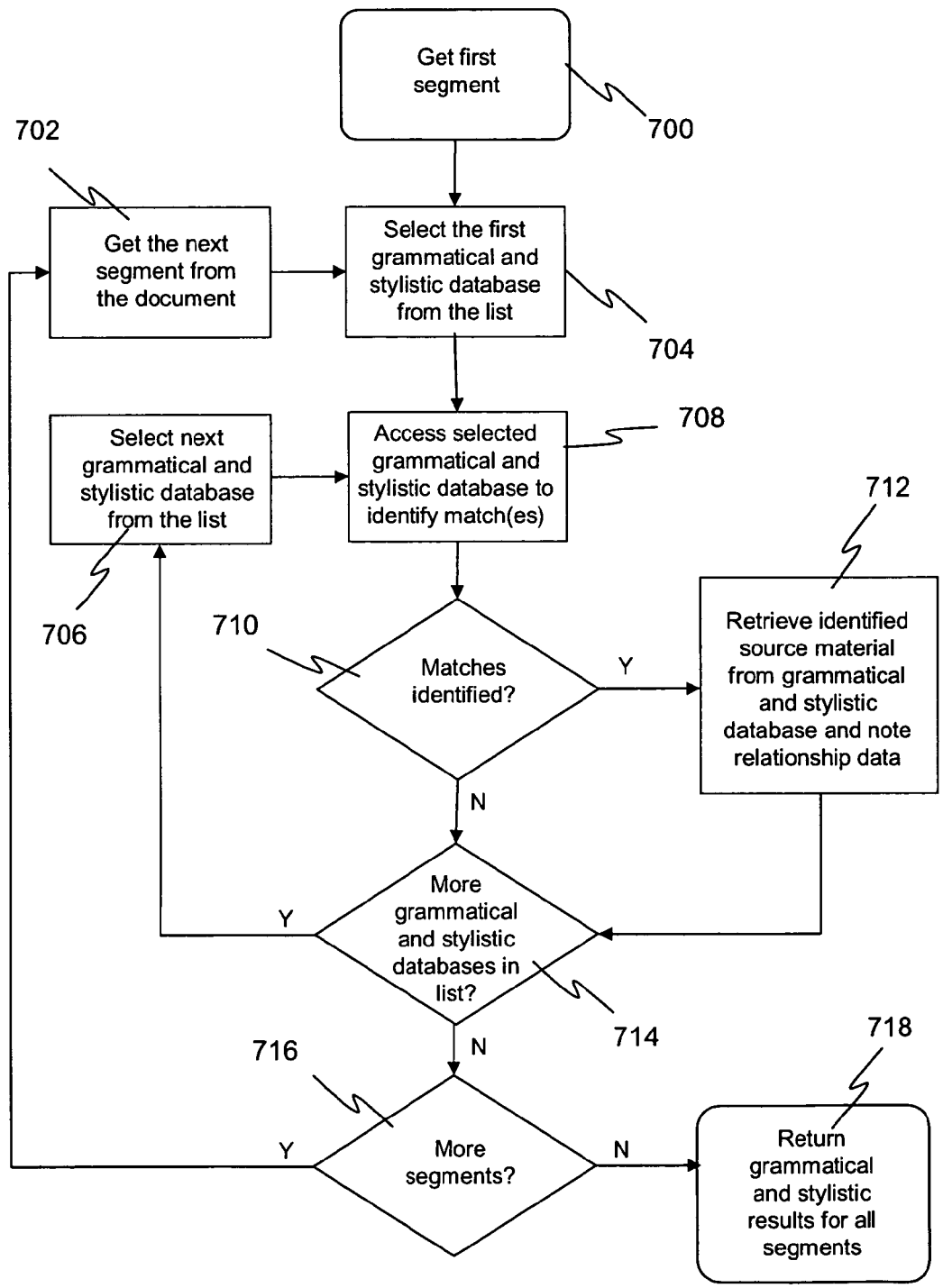
FIG. 7 is a flowchart showing the steps involved in a grammatical and stylistic authoring check according to an embodiment of the invention.

FIG. 7 is a flowchart showing the steps involved in a grammatical and stylistic authoring check according to an embodiment of the invention. This flowchart gives more detail on the steps carried out when the grammatical and stylistic sub-component 112 carries out a grammatical and stylistic authoring check for each part (for example, each segment) of source material being checked, according to step 412 of FIG. 4.

In step 700 of FIG. 7, the grammatical and stylistic sub-component 112 receives the first segment of source material to be checked from the bridging component 104 via the core component 100. The first grammatical and stylistic database from a list of grammatical and stylistic databases that the grammatical and stylistic sub-component 112 is configured for is selected in step 704. This could for example be a desktop, network or server based grammatical and stylistic database. The grammatical and stylistic sub-component 112 then accesses the selected grammatical and stylistic database in step 708 to identify any matches, i.e. stored material which has a relationship with the segment of source material being checked. The grammatical and stylistic sub-component 112 can be configured to identify, as shown in step 710, the closest match, which may be an exact match, or a number of the closest matches which are similar to the segment being checked. Any matches are retrieved in step 712 in a similar manner to that described above for the translation memory sub-component.

The grammatical and stylistic sub-component 112 then checks if there are more grammatical and stylistic databases to be checked in step 714.

If there are more grammatical and stylistic databases to be checked, the next one in the list of configured grammatical and stylistic databases is selected in step 706. Steps 708, 710, 712, 714 and 706 are then repeated accordingly for any further configured grammatical and stylistic databases.

The grammatical and stylistic sub-component 112 then determines whether there are any more segments of the source material currently being authored to be checked in step 716, in which case, the next segment is obtained from the bridging component 104 via the core component 100 in step 702 and the process repeats as above. If there are no more segments to be checked, then any identified results and data relating to any identified relationships are returned to the core component 100 which passes these on to the bridging component 104 in a suitable format.

In alternative embodiments, all segments that are to undergo translation memory, terminology and/or grammatical and stylistic checks may be passed en masse to the respective sub-components and checked against the relevant databases in groups of segments or a block of all the segments.

The invention includes functionality which can provide data reports on source material and any authoring checks carried out.

A report may be produced for one or more documents that a user is currently working on or one or more document that a user has previously worked on. The reports can provide various types of information, for example configuration settings, the number of segments and words, the number of identified translation memory, terminology and/or grammatical and stylistic matches or similarities, the number of forbidden terms identified, etc. Such reports can give a useful measure of how the invention has improved consistency in the source material and how translation workloads have been reduced. A report may be presented in a word processing document or a spreadsheet or such like and may include various presentation aids such as graphs, pie-charts, etc. and may include estimated translation cost savings.

The functionality disclosed herein may be embodied in a computer program product comprising a computer-readable medium having computer readable instructions recorded thereon for natural language translation, wherein the computer readable instructions are operative, when performed by a computerized device, to cause the computerized device to perform the corresponding method. Examples of such computer-readable media include, without limitation, semiconductor memory media, magnetic storage media, and optical storage media.

The above embodiments are to be understood as illustrative examples of the invention. Further embodiments of the invention are envisaged. It is to be understood that any feature described in relation to anyone embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method for use in natural language translation, said method comprising performing in software processes, the steps of:
   receiving source material segments being authored by a user in a first natural language;
   comparing, utilizing a module stored in memory and communicatively coupled with a processor, the received source material segments with stored material segments in the first natural language, said stored material segments having previously been translated from said first natural language to target segments in a second natural language;
   identifying a plurality of source material segments that are similar to stored material segments using a fuzzy match level;
   outputting the plurality of identified source material segments and respective similar stored material segments in a form suitable for review by a user;
   replacing identified source material segments with respective similar stored material segments to assist full translation of source material from said first natural language to at least said second natural language, wherein the replacing is carried out in response to input from a user and wherein the user chooses to amend the source material they are currently authoring according to stored material; and translating the authored source material using machine translation to:

reuse similar stored material segments replaced from translation memory and respective stored target segments stored in translation memory, and translate the source material segments not replaced from translation memory.

2. The method according to claim 1, comprising conducting full translation of said source material from said first natural language to at least said second natural language with reference to said stored material segments which have previously been translated into at least said second natural language.

3. The method according to claim 2, wherein said step of conducting full translation of said source material from said first natural language to at least said second natural language comprises a human translator translating parts of said source material which were not identified as being similar to stored material segments using the fuzzy match level.

4. The method according to claim 2, wherein said step of conducting full translation of said source material from said first natural language to at least said second natural language comprises a machine translation process translating parts of said source material which were not identified as being similar to stored material segments using the fuzzy match level.

5. The method according to claim 2, wherein said step of conducting full translation of said source material from said first natural language to at least said second natural language comprises a human translator and a machine translation process translating parts of said source material which were not identified as being similar to stored material segments using the fuzzy match level.

6. The method according to claim 2, comprising outputting said full translation of said source material in a form suitable for review by a user.

7. The method according to claim 6, wherein parts of said source material which were translated with reference to said stored material segments which had previously been translated into at least said second natural language, parts of said source material which were translated by a human translator, and parts of said source material which were translated by a machine translation process are output in different forms.

8. The method according to claim 7, wherein said different forms comprise different colors.

9. The method according to claim 1, wherein said stored material segments comprise at least one translation memory.

10. The method according to claim 9, wherein said at least one translation memory contains a plurality of stored segment pairs, each of said stored segment pairs comprising source material in said first natural language and a corresponding translation in at least said second natural language.

11. The method according to claim 10, wherein each of said stored segments pairs corresponds to at least one of:
a paragraph,
a sentence, and
a phrase.

12. The method according to claim 1, further comprising dividing said source material segments into a plurality of source segments prior to said comparison of said source material segments with said stored material segments.

13. The method according to claim 12, wherein said comparing comprises comparing said plurality of source segments with said stored material segments in said first natural language from a plurality of stored segments.

14. The method according to claim 12, wherein said identified source material segments comprise one or more of said plurality of source segments.

15. The method according to claim 12, wherein said source material segments are divided into said plurality of source segments where at least one of:
a full stop,
an exclamation mark,
a question mark,
a colon,
a semicolon,
a tab character, or
a paragraph mark,
appears in said source material segments.

16. The method according to claim 1, wherein said method comprises comparing said source material segments with preferred terminology material.

17. The method according to claim 16, wherein said replacing of identified source material segments with respective similar stored material segments comprises replacing a part of said source material segments with a part of said preferred terminology material.

18. The method according to claim 1, wherein said method comprises comparing said source material segments with forbidden terminology material.

19. The method according to claim 1, wherein stylistic options are in said stored material segments.

20. The method according to claim 19, wherein said replacement comprises replacing a part of said source material segments according to at least one option from said stylistic options.

21. The method according to claim 19, wherein said stylistic options comprise at least one of:
clarity and conciseness,
length of a sentence,
a commonly misused word,
unnecessary wording, and
a combination of specific characters.

22. The method according to claim 19, wherein said stylistic options are user configurable.

23. The method according to claim 1, wherein said identifying of the plurality of source material segments that are similar to stored material segments using the fuzzy match level further comprises a correlation between said identified plurality of source material segments and said identified stored material segments.

24. The method according to claim 23, wherein said correlation comprises a correlation of at least a predetermined level.

25. The method according to claim 23, wherein said predetermined level is user configurable.

26. The method according to claim 1, wherein said outputting further comprises outputting data associated with said identifying of the plurality of source material segments that are similar to stored material segments using the fuzzy match level.

27. The method according to claim 1, comprising said user inputting said source material into a first software process.

28. The method according to claim 27, wherein said outputting and said replacing steps are carried out by said first software process.

29. The method according to claim 27, wherein said first software process comprises word processing software.

30. The method according to claim 27, wherein said comparing and said identifying steps are carried out by a second software process.

31. The method according to claim 30, wherein said first software process interfaces with said second software process via an Application Program Interface (API).

32. The method according to claim 30, wherein said stored material segments are accessed by said second software process.

33. A computer program product comprising a non-transitory computer-readable medium having computer readable instructions recorded thereon for natural language translation, the computer readable instructions being operative, when performed by a computerized device, to cause the computerized device to perform a method comprising:
receiving source material segments being authored by a user in a first natural language;
comparing the received source material segments with stored material segments in the first natural language, said stored material segments having previously been translated from said first natural language to target segments in a second natural language;
identifying a plurality of source material segments that are similar to stored material segments using a fuzzy match level;
outputting the plurality of identified source material segments and respective similar stored material segments in a form suitable for review by a user;
replacing identified source material segments with respective similar stored material segments to assist full translation of source material from said first natural language to at least said second natural language, wherein the replacing is carried out in response to input from a user and wherein the user chooses to amend the source material they are currently authoring according to stored material; and
translating the authored source material using machine translation to:
reuse similar stored material segments replaced from translation memory and respective stored target segments stored in translation memory, and
translate the source material segments not replaced from translation memory.

34. A system for redirecting translation that will be used for portions of source material to using machine translation including translation memory to facilitate natural language translation, the system comprising:
an authoring environment configured to receive source material being authored by a user in a first natural language;
a core component configured to:
receive the source material from the authoring environment,
compare segments of the received source material with stored material in the first natural language, said stored material having previously been translated from said first natural language to at least a second natural language and stored in a translation memory as segment pairs, each including a source segment and a translation segment,
identify a source material segment which is similar to a source segment of a segment pair in the translation memory,
compare the source material with stylistic options, and
output the identified source material segment and the identified similar source segment of the source segment pair to the authoring environment;
the authoring environment further configured to:
present the identified source material segment and the identified similar source segment of the source segment pair to the user,
replace the identified source material segment with the identified similar source segment of the source segment pair in response to input from the user to amend the source material the user is currently authoring, and to redirect translation of the source segment to be translated by machine translation using the translation memory during translation of the source material; and
a machine translator to perform machine translation of the source material, the machine translator configured to reuse portions of the source material replaced from translation memory and translate portions of the source material not replaced from translation memory.

* * * * *